United States Patent [19]

McKenzie

[11] 3,904,560

[45] Sept. 9, 1975

[54] MARK-RESISTANT GLARE-FREE PAINT COMPOSITION

[75] Inventor: Eugene L. McKenzie, North St. Paul, Minn.

[73] Assignee: Minnesota Mining and Manufacturing Company, St. Paul, Minn.

[22] Filed: Oct. 12, 1971

[21] Appl. No.: 188,449

[52] U.S. Cl.......... 260/22 A; 260/37 R; 260/37 EP; 260/37 N; 260/40 R; 260/998.19; 350/105
[51] Int. Cl.².......................................... C09D 3/64
[58] Field of Search............ 94/1.5; 260/22 A, 37 R; 350/105

[56] References Cited

UNITED STATES PATENTS

| | | | |
|---|---|---|---|
| 2,574,972 | 11/1951 | Hill | 94/1.5 |
| 2,865,266 | 12/1958 | Wynn | 94/1.5 |
| 3,005,790 | 10/1961 | Wynn et al. | 94/1.5 |
| 3,204,537 | 9/1965 | Searight | 94/1.5 |
| 3,642,675 | 2/1972 | McKenzie | 260/37 R |

*Primary Examiner*—Ronald W. Griffin
*Attorney, Agent, or Firm*—Alexander, Sell, Steldt & DeLaHunt

[57] ABSTRACT

Mark-resistant, glare-free coating compositions are provided by using as a flatting agent a mixture of solid and hollow inert noncoalescing microspheres.

3 Claims, No Drawings

MARK-RESISTANT GLARE-FREE PAINT COMPOSITION

The paint industry has succeeded in providing "flat" paints that form paint films having a smooth, "flat"— that is, glare-free—appearance, good color, and good hiding; are moderate in cost; can be easily applied; and are substantially odorless during application. But marking of the applied films remains an unsolved problem. This marking problem arises because conventional flat paints include a high loading of rather rigid, rough, particulate flatting agents such as silica or diatomaceous earth to roughen the surface of the applied films. Scuffing, scraping, or rubbing such films removes or crushes parts of the rigid flatting agent particles, and the result is an unsightly mark.

Marking is an especially serious deficiency for flat paint films on interior architectural walls, which commonly experience bumping or scraping by furniture, toys, or other articles, or smudging around doorways, light-switches, railings, and the like. If the scuffing or scraping does not make a permanent mark, an attempt to clean the walls often will. Because of high susceptibility to marking and soiling, most interior architectural walls painted with conventional flat paints must be repainted rather often. And in areas where a high amount of scuffing, smudging, and staining takes place, as in kitchens, bathrooms, and hallways of homes, flat paints often cannot be used at all.

Coating compositions that use solid glass beads or microspheres as a flatting agent avoid many of the problems associated with rough inorganic flatting agent particles, because the glass microspheres are hard and not easily fractured or removed from the paint film. However, when an applied paint film that incorporates solid glass microspheres as the flatting agent is vigorously cleaned or scrubbed, a different kind of disturbing effect is introduced. A thin coating of paint ordinarily covers the surfaces of projecting microspheres in the paint film, and the cleaning action tends to remove this coating. The result is that light rays penetrate the microspheres and are retroreflected, to the extent that there is an unattractive difference between a cleaned area and the surrounding areas, especially to a person standing between a window or light and the cleaned area.

It has now been found that the reflectivity of such cleaned areas can be greatly reduced by replacing part of the solid microspheres with hollow microspheres. The hollow microspheres hardly reflect light at all, and their use so reduces the overall reflectivity of a cleaned area that it is hardly noticeable. And while parts of the hollow microspheres may be removed during scuffing or scraping of the applied paint film, concave recesses are formed in the film by the remaining portion of the microspheres and these recesses contribute to the roughness that makes the applied film glare-free.

Briefly, a paint or coating composition of the invention comprises (1) a paint vehicle (that is, the liquid portion of a paint composition that forms a durable adherent paint film when applied to a substrate and exposed to an appropriate environment); and (2) a mixture of solid and hollow inert noncoalescing microspheres dispersed in the paint vehicle and adapted to uniformly and minutely roughen the surface of an applied film of the composition to reduce glare from the film. The average diameter of the hollow microspheres is about the same as or less than the average diameter of the solid microspheres, and the volume ratio of solid to hollow microspheres lies between about 3:1 and 1:3.

DETAILED DESCRIPTION

Paint compositions of the invention may include a wide variety of paint vehicles, which comprise a film-forming paint binder and usually also include a volatile liquid in which the binder is carried. In practice, compositions of the invention will include the more commonly used paint vehicles, namely those based on such film-forming binders as alkyds, drying oils, polyurethanes, acrylics, vinyls, epoxies, ureas, and allyls. Generally the film-forming binder is dissolved in a volatile solvent, though latexes in which the film-forming binder is dispersed in a liquid such as water are also useful. The paint films may be formed by a curing reaction, typically an oxidation reaction through which the binder molecules are cross-linked or a Diels-Alder reaction linking the binder molecules through unsaturated portions of the molecule; or by coagulation or densification of the film-forming binder upon evaporation of the volatile liquid. The paint vehicle chosen will typically depend on choices as to such factors as properties of the film matrix (such as appearance, durability, or elasticity), application method, or rate of drying or curing. Generally, at least 5 volume-percent of the vehicle is film-forming binder, and at least 5 volume-percent is volatile liquid.

The solid and hollow microspheres incorporated in a coating composition of the invention are usually made of glass and are typically transparent and colorless, but they may be made of other materials and may be colored. The substantially spherical form of these flatting agent particles, which occurs naturally during formation of the particles, is useful in forming mark-resistant smooth paint films, but it is not essential. The microspheres are of a size and included in an amount such that they will uniformly and minutely roughen the surface of an applied film without making it unduly harsh to the touch or difficult to clean. Generally this means that the microspheres have an average diameter between about 10 and 70 microns, and preferably between 20 and 50 microns. While the microspheres will be present in a range of sizes, preferably at least 70 percent of them will be within 20 microns of the average diameter. The average diameter of the solid and hollow microspheres is generally about the same, though the hollow microspheres may be somewhat smaller.

When a composition of the invention is coated out on a surface, there will be tens of thousands of microspheres per square inch of applied film. Generally, the microspheres will occupy between about 10 and 60 volume-percent and preferably between 20 and 50 volume-percent, of the nonvolatile portion of a composition of the invention (up to 80 volume-percent of the nonvolatile portion of a composition of the invention can be microspheres to achieve special effects). To reduce the effect of reflectivity from a vigorously cleaned film while maintaining good mark-resistance, the hollow microspheres should account for between 25 and 75 volume-percent of the mixture of hollow and solid microspheres, meaning that the volume ratio of hollow microspheres to solid microspheres is between 3:1 and 1:3.

Compositions of the invention may be transparent and colorless, but most often include a coloring agent such as a hiding-type pigment or dye. Further, the compositions may include additives such as driers, flow-control agents, and adhesion-promoters and also may include fillers that extend the composition, control application properties, etc. However, for the best mark-resistance, the compositions include only low amounts of particulate pigments or fillers, so that the thin coating of paint that typically covers the protruding portions of the microspheres in an applied paint film does not itself lead to marking. Coating compositions of the invention are generally substantially free of specular reflective materials that would make visually exposed microspheres retro-reflective.

As an example of a composition of the invention, a mixture of equal volume parts of hollow glass microspheres and solid glass microspheres having an average diameter of about 40 microns was blended with mineral spirits to form a wet cake. This wet cake was then stirred into a standard interior semigloss enamel having the following basic formulation:

|  | Volume-percent |
|---|---|
| Blend of long-oil soya alkyd and heavy-bodied soya alkyd | 26 |
| Petroleum solvent | 55 |
| Titanium dioxide and extender pigments | 18 |
| Driers | 1 |

After mixing, the microspheres accounted for 39 volume-percent of the nonvolatile portion of the composition.

This paint composition was roll-coated onto plaster wallboard to form a mark-resistant attractive coating. When the film was scrubbed with a wet cleaning rag and soap or with a cleaning rag soaked with a cleaning solvent, and the scrubbed area illuminated with a flashlight, the scrubbed area could barely be noticed.

What is claimed is:

1. A paint composition for forming mark-resistant glare-free paint films comprising
   A. a paint vehicle; and
   B. a mixture of solid and hollow inert noncoalescing microspheres dispersed in the vehicle and adapted to uniformly and minutely roughen the surface of an applied film of the composition to reduce glare from the film; the average diameter of the hollow microspheres being the same as or less than the average diameter of the solid microspheres, and the volume ratio of solid to hollow microspheres lying between about 3:1 and 1:3.

2. A composition of claim 1 in which the volume ratio of solid microspheres to hollow microspheres is about 1:1.

3. A composition of claim 1 in which the average diameter of the solid microspheres is the same as the average diameter of the hollow microspheres.

* * * * *